Dec. 11, 1928.  E. VON DER LIPPE-LIPSKI  1,694,511

AUTOMATIC CONTROL FOR HEADLIGHTS

Filed June 23, 1924

Inventor
Elaine von der Lippe-Lipski.
By Thomas E. Beale
Attorney

Patented Dec. 11, 1928.

1,694,511

UNITED STATES PATENT OFFICE.

ELAINE VON DER LIPPE-LIPSKI, OF ATLANTIC HIGHLANDS, NEW JERSEY.

AUTOMATIC CONTROL FOR HEADLIGHTS.

Application filed June 23, 1924. Serial No. 721,962.

My invention is an improvement in headlights, especially those used on automobiles, and the primary object in view is to provide means for regulating the lights or dimming them automatically during the operation of the automobile under varying conditions of light.

In driving an automobile it is of course desirable when travelling along a dark street or roadway that the headlights should be turned on to their full capacity in order to illuminate the roadway ahead for the guidance of the driver, but under other conditions—as for instance in driving over a roadway or city street that is well lighted—there is no necessity for the headlights to be bright and consequently it is safer for others in the path of the automobile, as well as more economical, to have them turned down or dimmed, and though the control of the headlights for this purpose is at present effected manually by the operation of an electric-switch it is my intention to provide means that will accomplish the operaton automatically, employing preferably a selenium cell which as is well understood exhibits under the influence of light a remarkable variation in electric conductivity.

My invention therefore contemplates providing an automobile at the front end thereof with a light conducting medium affecting the resistance of an electric current or selenium cell in circuit with conventional electric headlights, whereby when the automobile approaches a well lighted area said headlights will be automatically turned down or dimmed and when it is travelling along a dark roadway the headlights will be turned on to more or less full capacity by the action of the selenium cell, so that this important part of the proper operaton of an automobile need not require the attention of the driver.

In the accompanying drawings:—

Figure 1:
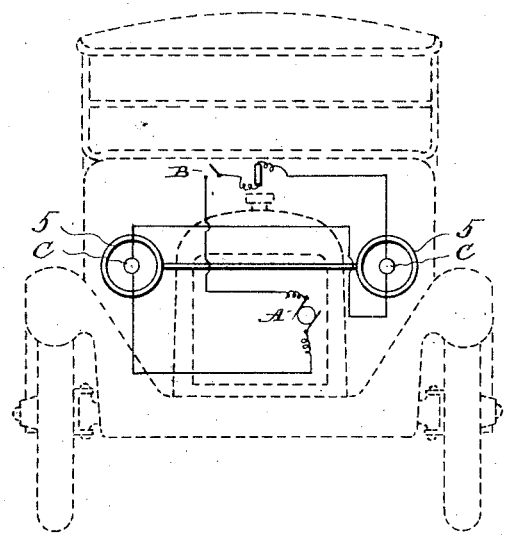
Fig. 1 is a front elevation illustrating the application of my invention.
Figure 2:
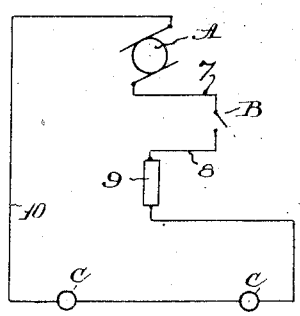
Fig. 2 is a diagrammatic view illustrating the circuits.

In carrying out my invention, as it is applied to an automobile, the means providing for an automatic control of the headlights is used in connection with any ordinary type of electric headlight 5 and is included in the circuit or circuits to said headlights; said means in the present instance being preferably a selenium cell to vary the conductivity of the electric circuit and therefore is included in said circuit. As shown in Figs. 1 and 2 a single selenium cell is employed in a circuit connecting the two headlights in series, whereas in the modification Fig. 4 there is a separate circuit to each headlight with a selenium cell in each circuit, for the purpose hereinafter explained.

In the form in which a single selenium cell or light sensitive medium is used with the lamps of the headlights connected in series the wiring shown in the diagrammatic view Fig. 2 is employed, in which wire 7 from one side of a source of electric energy, as generator A, is lead to one terminal of switch B, a wire 8 is lead from the other terminal or contact point of the switch to the selenium cell 9, and a wire 10 is lead from the other side of generator A through the lamps C C in series to the selenium cell; whereby when the switch is closed the circuit will be from generator by wire 7, switch B and wire 8 to the selenium cell and passing through the latter will return to the generator by wire 10 to which the lamps C C are connected in series; thus the lamps and selenium cell being connected in series the amount of current supplied to the lamps will depend upon the conductivity of the cell, and as in this instance a light conducting medium or selenium cell is used in which the conductivity thereof is decreased under the influence of light the current will be decreased in the lamps and consequently lower their brilliancy when rays of light are projected on the selenium cell. This is a simple application of this form of selenium cell for the purposes hereinbefore stated.

Figure 3:
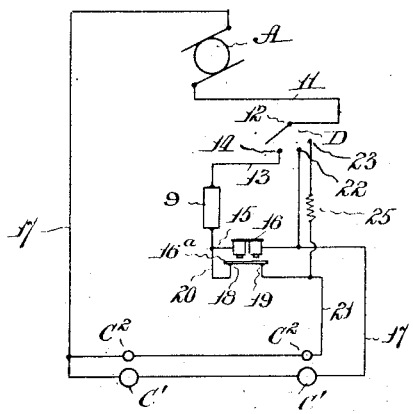
Fig. 3 is a modification.
Figure 5:
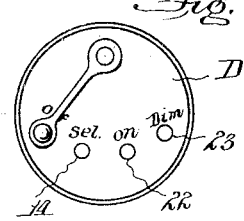
Fig. 5 is a view of the electric switch used in changing the circuits.

In Fig. 3 I have shown an arrangement in which each headlight has two lamps—one, C' giving a bright light and the other, C² a dim light. In this instance the wiring from generator A to selenium cell 9 is the same as that described with reference to the arrangement in Fig. 2, that is by wire 11 to terminal 12 of switch D and by wire 13 from other terminal or contact point 14 of said switch to the selenium cell, but in this instance provision is made for shunting the circuit from one set of lamps, as C', to another, as C² and vice versa. For this purpose wire 15 from the selenium cell is connected to an electric magnet 16 through which the current will pass to wire 17 connecting the lamps C' C'. in circuit to the generator and consequently said lamps will be in circuit when the conductivity of the selenium cell permits free passage of the current, the electric magnet providing for shunting the circuit to the other lamps C² C² when the strength of the current is reduced by the reduction of the conductivity of the selenium cell under the influence of light. This is accomplished by locating two contact points 18 and 19 immediately below armature 16ª of magnet 16, so that said armature will bridge the contact points, leading a wire 20 from the selenium cell to contact point 18 and connecting wire 21 feeding lamps C² C² to contact point 19 and wire 17, the latter connection being at a point to cut out the lamps C' C'. It will be readily seen that by this arrangement armature 16ª will drop as soon as the strength of current through its magnet is reduced by the lowering of the conductivity of the selenium cell and shunt the current to the lamps C² C² by way of wires 20 and 21.

In the modification just described I have also provided a form of switch and connections for putting either set of lamps C' C' of C² C² in direct circuit—cutting out the selenium cell and magnet—by adding to said switch contact points 22 and 23 and connecting them by wires to the wires 17 and 21 respectively, the throw of the switch lever sweeping the contact-points 14, 22 and 23 so as to connect any one of the three circuits. As will be obvious, when the switch-lever is on contact-point 22 the brighter lamps C' C' will be in circuit with the generator, and when on contact-point 23 the lamps C² C² will be in the circuit, it being desirable in this latter instance to include a resistance coil 25 in the wiring between contact-point 23 and wire 21 to prevent a deflection of the current to the electric magnet by way of armature and selenium cell and thus interfere with the desired operation of this particular circuit.

From the foregoing description the operation of the automatic control for headlights of automobiles will be readily understood, for in the simple form of the invention as shown in the diagrammatic view Fig. 2 the switch B is closed to put the lamps and selenium cell in circuit with the generator A so that the lamps C C of the headlights, also in the circuit, will be bright when the conductivity of the selenium cell passes the current freely, as when the automobile is travelling along a darkened roadway. On the other hand when the automobile approaches a light or a lighted area the conductivity of the form of selenium cell used will be lowered and the lamps correspondingly dimmed on account of the reduction in the amount of current supplied to the lamps, it being understood that the selenium cell is interposed between said lamps and that side of the generator from which the current flows, as hereinbefore described. A similar operation takes place in the arrangement shown in Fig. 3, but in this instance when the conductivity of the form of selenium cell used is good the electro-magnet interposed between said cell and the lamps C' C' will pick up the armature and cut out the smaller lamps C² C² so that said other lamps will receive the current and throw bright lights on the darkened roadway, and as the automobile enters a lighted area causing a reduction in the conductivity of the selenium cell the strength of the magnet will be lowered by the reduction in current through the same, whereby the armature dropping onto the spaced contact-points will shunt the circuit to the smaller lamps C² C² and cut out the larger lamps, thus dimming the headlights. During this operation the lever of switch D is on contact-point 14. If for any reason it is desired to change the circuits or control the lamps by manual operation the switch-lever may be turned to connect with contact-point 22 to put the brighter lights in the circuit or to contact-point 23 for putting the smaller lights in circuit.

Figure 4:
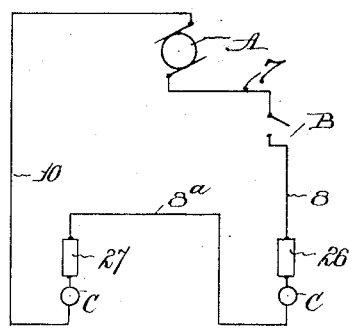
Fig. 4 is a further modification.

The diagrammatic view Fig. 4 shows a simple arrangement for using separate selenium cells for each headlight, the cells 26 and 27 having separate wire connections to its respective lamp, and of course this will provide for varying the conductivity of the cells and consequently varying the brilliancy of the lamps, for any purpose.

It will be understood, also, that either arrangement of circuits described may be used for controlling lamps under other circumstances than those hereinbefore stated; that is in other situations than in connection with automobile head-lights; and, furthermore, the arrangement shown in Fig. 3 could be modified for use in connection with parking lights so that the selenium cell would automatically open the circuit when its conductivity is lowered by light, thus economizing electricity, as for instance when an automobile is parked out over night the lights would be automatically extinguished and the circuit opened at daybreak.

I claim:

1. Means for controlling the brilliancy of electric head-lights comprising a source of electric energy, electric head-lights in circuit therewith, and a light sensitive medium having the property of decreasing its conductivity of the electric current by the action of light thereon, said medium being included in the circuit between the source of electric energy and the electric headlights.

2. Means for controlling the brilliancy of electric headlights comprising a source of electric energy, electric headlights in circuit therewith, and a selenium cell having the property of decreasing its conductivity of the electric current by the action of light thereon, said selenium cell being included in the circuit between the source of electric energy and the headlights.

3. Means for controlling the brilliancy of electric headlights comprising a source of electric energy, two sets of electric headlights of different candle-power, a light sensitive medium included in the circuit and having the property of decreasing its conductivity of the electric current by the action of light thereon, and a relay having its operating coil in circuit with said light sensitive medium and one set of headlights and its contacts in circuit with said light sensitive medium and the other set of headlights, for changing the circuit from one set of headlights to the other on operation of the relay.

ELAINE von der LIPPE-LIPSKI.